US009102165B2

(12) United States Patent
Asai (10) Patent No.: US 9,102,165 B2
(45) Date of Patent: Aug. 11, 2015

(54) IMAGE RECORDING APPARATUS AND IMAGE RECORDING METHOD

(71) Applicant: DAINIPPON SCREEN MFG. CO., LTD, Kyoto (JP)

(72) Inventor: Hiroshi Asai, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 13/766,525

(22) Filed: Feb. 13, 2013

(65) Prior Publication Data

US 2013/0257950 A1 Oct. 3, 2013

(30) Foreign Application Priority Data

Mar. 28, 2012 (JP) .................................. 2012-073602

(51) Int. Cl.
| | |
|---|---|
| *B41J 2/21* | (2006.01) |
| *B41J 2/205* | (2006.01) |
| *B41J 2/045* | (2006.01) |
| *H04N 1/409* | (2006.01) |
| *H04N 1/387* | (2006.01) |

(52) U.S. Cl.
CPC ............ *B41J 2/2121* (2013.01); *B41J 2/04526* (2013.01); *B41J 2/205* (2013.01); *B41J 2/2128* (2013.01); *B41J 2/2146* (2013.01); *H04N 1/3878* (2013.01); *H04N 1/4097* (2013.01); *H04N 1/387* (2013.01)

(58) Field of Classification Search
None
See application file for complete search history.

(56) References Cited

U.S. PATENT DOCUMENTS

| | | | |
|---|---|---|---|
| 5,568,169 A | 10/1996 | Dudek et al. | |
| 6,382,757 B1 | 5/2002 | Kakutani | |
| 7,742,195 B2 * | 6/2010 | Kakutani ...................... 358/3.13 |
| 2001/0022596 A1 * | 9/2001 | Korol .............................. 347/10 |
| 2002/0181987 A1 | 12/2002 | Kakutani | |
| 2004/0113958 A1 * | 6/2004 | Minnebo et al. ................... 347/5 |
| 2004/0119765 A1 | 6/2004 | Fujimori et al. | |
| 2008/0192298 A1 | 8/2008 | Asai | |
| 2008/0238966 A1 | 10/2008 | Nishihara | |
| 2010/0053247 A1 | 3/2010 | Kakutani | |
| 2010/0245444 A1 | 9/2010 | Asai | |

FOREIGN PATENT DOCUMENTS

| | | | |
|---|---|---|---|
| CN | 1509234 A | 6/2004 | |
| EP | 0 962 323 A1 | 12/1999 | |

(Continued)

OTHER PUBLICATIONS

European Search Report issued in Application No. 13 153 058.06 (counterpart of the present US application) dated Jun. 20, 2013.

*Primary Examiner* — Justin Seo
(74) *Attorney, Agent, or Firm* — McDermott Will & Emery LLP (57) ABSTRACT

In an image recording apparatus, only small ink droplets are ejected toward a recording medium in the range of tone values less than a second tone value. In the range of tone values greater than or equal to the second tone value and less than a first tone value, large and small droplets are ejected toward the recording medium. The first tone value is less than or equal to a 50% tone value, and the total ejection rate at the first tone value is less than 50%. In the range of tone values greater than or equal to the first tone value, only large droplets are ejected toward the recording medium. Thus, the occurrence of streaking can be suppressed while reducing the degree of instability of the landing positions of fine droplets of ink.

18 Claims, 8 Drawing Sheets

(56) References Cited

FOREIGN PATENT DOCUMENTS

| EP | 1108540 A1 | 6/2001 |
| EP | 1 816 850 A1 | 8/2007 |
| JP | 08-187880 A | 7/1996 |
| JP | 11-348322 A | 12/1999 |
| JP | 2001-219584 A | 8/2001 |
| JP | 2002-185790 A | 6/2002 |
| JP | 2005-278209 A | 10/2005 |
| JP | 2006-51617 A | 2/2006 |
| JP | 2010-52228 A | 3/2010 |
| JP | 2010-221584 A | 10/2010 |
| WO | 02/30676 A1 | 4/2002 |
| WO | 2007088154 A1 | 8/2007 |

* cited by examiner

IMAGE RECORDING APPARATUS AND IMAGE RECORDING METHOD

TECHNICAL FIELD

The present invention relates to an image recording apparatus for recording an image on a recording medium and an image recording method thereof.

BACKGROUND ART

Conventionally, there have been image recording apparatuses that are used to record images on recording media using an inkjet system by moving an ejection unit relative to the recording media, the ejection unit having a plurality of nozzles arranged and each ejecting fine droplets of ink.

In recent years, miniaturization of ink droplets enables reproduction of high-resolution images and recording of sharp characters and line images. The graininess of images can also be improved, and image quality with smooth gradation can be obtained.

The reduction in the size of ink droplets in turn makes streaks noticeable in natural and tint images. Such tendency is particularly evident in so-called single-pass image recording apparatuses. Thus, as described in Japanese Patent Application Laid-Open No. 2010-221584 and No. 11-348322, image recording apparatuses capable of forming a plurality of types of dots having different sizes are used in order to suppress the occurrence of streaking (banding).

Incidentally, if a large number of small sized droplets are used, streaking will be noticeable in an area extending from an intermediate range of tone values in an image (hereinafter, referred to as an "intermediate area") to a shadow area. In particular, streaking becomes noticeable in the range of tone values that are greater than or equal to a 50% tone value at which ink dots formed on a recording medium start merging with their four diagonally neighboring dots. Thus, the apparatus disclosed in Japanese Patent Application Laid-Open No. 2010-221584 reduces the utilization rate of droplets of a small size with increasing tone value in an image, thereby suppressing the occurrence of noticeable streaking.

However, with the apparatus disclosed in Japanese Patent Application Laid-Open No. 2010-221584, for all the tone values, droplets of a small size are ejected and small-size dots are formed on a recording medium. If the width of the dots is greater than the width of recording pixels that are set on the recording medium, a phenomenon will take place in which tension acts between the droplets landed on the recording medium and ink droplets landed later are drawn toward ink droplets landed in advance. In particular, in the intermediate and shadow areas where the number of neighboring droplets increases, areas to be colored by the landing of droplets (hereinafter, simply referred to as "landing positions") may become unstable. In addition, because small droplets are susceptible to the effects of air currents or the like and thus fly unstably, the landing positions become more unstable.

SUMMARY OF INVENTION

The present invention is intended for an image recording apparatus for recording an image on a recording medium, and it is an object of the present invention to suppress the occurrence of streaking while reducing the degree of instability of the landing positions of droplets.

The image recording apparatus includes an ejection part that ejects fine droplets of ink toward a recording medium, a movement mechanism that moves the recording medium relative to the ejection part, and a control part that controls the ejection part and the movement mechanism so that an image is recorded on the recording medium, wherein a size of fine droplets of ink ejected from the ejection part is switchable, a width of a dot that is formed on the recording medium by a fine droplet of ink having a minimum size is greater than a width of a recording pixel that is set on the recording medium, the control part stores a first tone value and a second tone value, the first tone value being greater than a minimum tone value that is expressible on the recording medium and being less than or equal to a 50% tone value that is a median value between the minimum tone value and a maximum tone value, and the second tone value being greater than the minimum tone value and being smaller than the first tone value, and as a result of the control part controlling the ejection part, in a range of tone values that are greater than or equal to the first tone value, only a first droplet that is a fine droplet of ink having a maximum size is ejected toward the recording medium, and in a range of tone values that are greater than or equal to the second tone value and less than the first tone value, the first droplet and a second droplet that is a fine droplet of a size smaller than the first droplet are ejected toward the recording medium, and a total ejection rate and a first droplet rate increase gradually with increasing tone value, the total ejection rate being a total of ejection rates of fine droplets of ink of all sizes, and the first droplet rate being a proportion of an ejection rate of the first droplet to the total ejection rate. Accordingly, it is possible to suppress the occurrence of streaking while reducing the degree of instability of the landing positions of droplets.

According to a preferred embodiment of the present invention, the second droplet is a fine droplet of the minimum size.

According to another preferred embodiment of the present invention, the second droplet is greater than a third droplet that is a fine droplet of the minimum size.

More preferably, in part of a range of tone values that are less than the first tone value, the first droplet, the second droplet, and the third droplet are ejected toward the recording medium, the total ejection rate and the first droplet rate increase gradually with increasing tone value, and in the part of the range of tone values, a second droplet rate that is a proportion of an ejection rate of the second droplet to the total ejection rate is greater than a third droplet rate that is a proportion of an ejection rate of the third droplet to the total ejection rate.

According to another preferred embodiment of the present invention, an increasing rate of the total ejection rate with increasing tone value in a range of tone values that are less than the second tone value is greater than an increasing rate of the total ejection rate with increasing tone value in the range of tone values that are greater than or equal to the second tone value and less than the first tone value.

According to another preferred embodiment of the present invention, the control part controls ejection rates of fine droplets of ink of the all sizes ejected from the ejection part by comparing a pixel value in an original image of the image and a threshold value in a threshold matrix.

The present invention is also intended for an image recording method of recording an image on a recording medium. The image recording method includes the steps of a) ejecting fine droplets of ink from an ejection part toward a recording medium, and b) recording an image on the recording medium by moving the recording medium relative to the ejection part in parallel with the step a), wherein a first tone value and a second tone value are prepared in advance, the first tone value being greater than a minimum tone value that is expressible on the recording medium and being less than or equal to a 50% tone value that is a median value between the minimum tone value and a maximum tone value, and the second tone value being greater than the minimum tone value and smaller than the first tone value, a size of fine droplets of ink ejected from the ejection part is switchable, a width of a dot that is formed on the recording medium by a fine droplet of ink of a minimum size is greater than a width of a recording pixel that is set on the recording medium, and as a result of the ejection part being controlled in the step a), in a range of tone values that are greater than or equal to the first tone value, only a first droplet that is a fine droplet of ink of a maximum size is ejected toward the recording medium, and in a range of tone values that are greater than or equal to the second tone value and less than the first tone value, the first droplet and a second droplet that is a fine droplet of a size smaller than the first droplet are ejected toward the recording medium, and a total ejection rate and a first droplet rate increase gradually with increasing tone value, the total ejection rate being a total of ejection rates of fine droplets of ink of all sizes, and the first droplet rate being a proportion of an ejection rate of the first droplet to the total ejection rate. Accordingly, it is possible to suppress the occurrence of streaking while reducing the degree of instability of the landing positions of droplets.

These and other objects, features, aspects and advantages of the present invention will become more apparent from the following detailed description of the present invention when taken in conjunction with the accompanying drawings.

DESCRIPTION OF EMBODIMENTS

Figure 1:
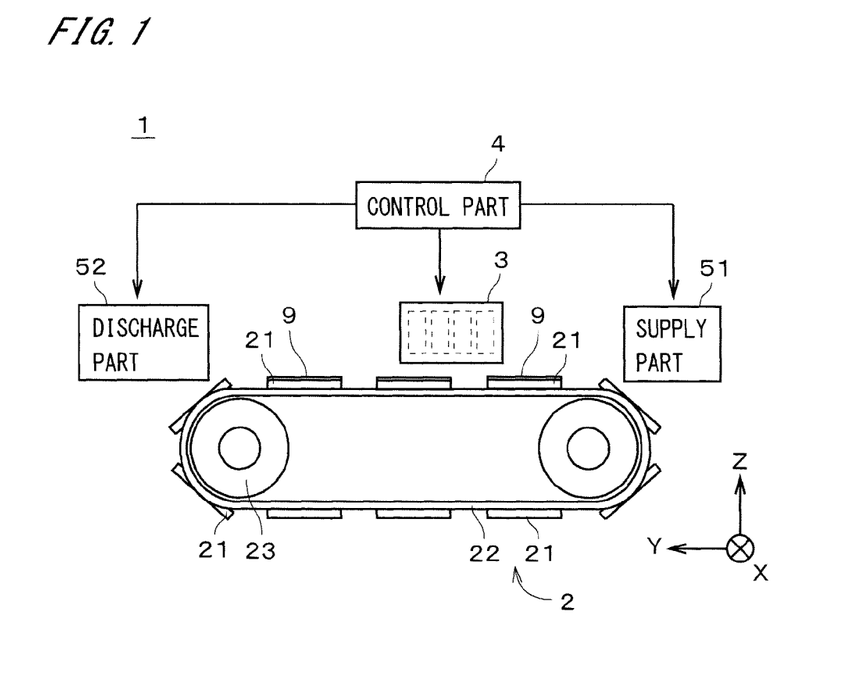
FIG. 1 illustrates a configuration of an image recording apparatus according to a first embodiment.

FIG. 1 illustrates a configuration of an image recording apparatus 1 according to a first embodiment of the present invention. The image recording apparatus 1 is a sheet-fed printing apparatus (so-called "inkjet printer") that sequentially records color images on a plurality of recording media 9 by ejecting fine droplets of ink on the recording media 9 that is printing paper.

As illustrated in FIG. 1, the image recording apparatus 1 includes a movement mechanism 2 for moving the recording media 9 in a movement direction that is the (+Y) direction in FIG. 1, an ejection unit 3 that ejects fine droplets of ink toward the recording media 9 that are being conveyed by the movement mechanism 2, a supply part 51 that supplies the recording media 9 to the movement mechanism 2, a discharge part 52 that receives the printed recording media 9 from the movement mechanism 2, and a control part 4 that controls these mechanisms. The ejection unit 3 is disposed above the movement mechanism 2 (on the (+Z) side) and fixed to a frame (not shown).

The movement mechanism 2 includes a plurality of stages 21, an annular guide 22, and a belt driving mechanism 23. The stages 21 each adsorb and hold a sheet of recording medium 9. The guide 22 includes therein a belt to which the stages 21 are connected, and guides the stages 21. The belt driving mechanism 23 moves the belt in the guide 22 counterclockwise in FIG. 1 so as to move the stages 21 on which the recording media 9 are held in the (+Y) direction below the ejection unit 3 (i.e., on the (−Z) side).

Figure 2:
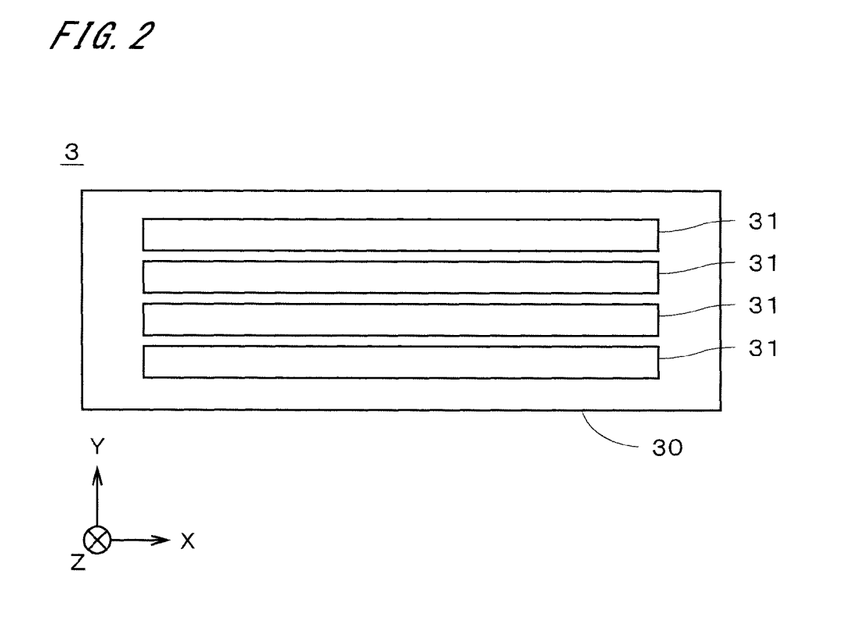
FIG. 2 is a bottom view of an ejection unit.

FIG. 2 is a bottom view of the ejection unit 3. The ejection unit 3 is provided with a plurality of (in the present embodiment, four) heads 31 that serve as ejection units, each ejecting ink of a different color to the recording media 9, and that have the same structure. The heads 31 are arranged in the Y direction (i.e., movement direction) and attached to an attachment part 30 of the ejection unit 3. Each of the heads 31 has a plurality of outlets arranged in the X direction that is perpendicular to the Y direction, which is the movement direction of the recording media 9. Note that the outlets do not necessarily have to be arranged in the X direction, and it is sufficient for the outlets to be arranged in a direction that intersects with the Y direction.

The size of fine droplets of ink ejected from each outlet of each head 31 is switchable (that is, each outlet can eject a different amount of fine droplets). As a result of the size of droplets being switched, the size of dots formed on the recording media 9 by the droplets landing on the recording media 9 is also switched. In the present embodiment, the size of fine droplets of ink is switched between two types, a "large size" and a "small size", the large size being a maximum size that the heads 31 can eject, and the small size being a minimum size that the heads 31 can eject and smaller than the large size. Accordingly, ink dots to be formed on the recording media 9 are switched between "large dots" and "small dots".

Figure 3:
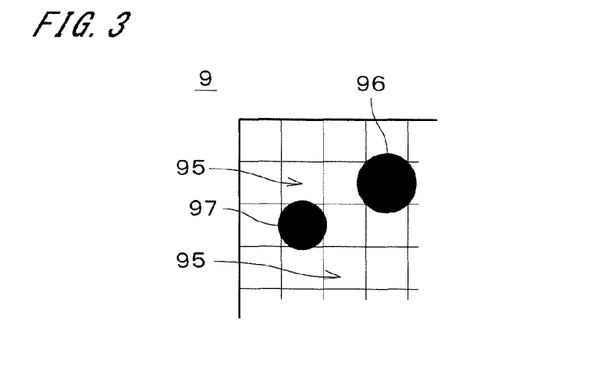
FIG. 3 illustrates part of a recording medium.

FIG. 3 illustrates part of a recording medium 9. In FIG. 3, a plurality of recording pixels 95 (hereinafter, simply referred to as "pixels 95") that are set on the recording medium 9 are indicated by thin lines. In FIG. 3, a large dot 96 formed by a droplet of the large size and a small dot 97 formed by a droplet of the small size are illustrated together. As shown in FIG. 3, the width of the dot formed on the recording medium 9 by the fine droplet of ink of the small size, i.e., fine droplet of ink of the minimum size among fine droplets of ink of a plurality of sizes ejected from the heads 31 of the ejection unit 3, is greater than the width of a pixel 95 with respect to both the X and Y directions.

The head 31 on the most downstream side in the Y direction (−Y side) in FIG. 2 ejects K (black) ink, the head 31 on the (+Y) side of the K ink head 31 ejects C (cyan) ink, the head 31 on the (+Y) side of the C ink head 31 ejects M (magenta) ink, and the head 31 on the most upstream side in the Y direction (+Y side) ejects Y (yellow) ink. Note that the ejection unit 3 may also be provided with inkjet heads for other colors such as light cyan, light magenta, or white.

In the image recording apparatus 1, with respect to the X direction, each head 31 is disposed over the entire recording area of a recording medium 9 (in the present embodiment, across the entire width of the recording medium 9 in the X direction). A main control part 41 (see FIG. 4) of the control part 4 controls the ejection unit 3 and the movement mechanism 2 so that the recording of an image on a recording medium 9 is completed by the recording medium 9 passing only once over positions facing the heads 31 of the ejection unit 3. In other words, the image recording apparatus 1 performs single-pass printing on the recording media 9.

Figure 4:
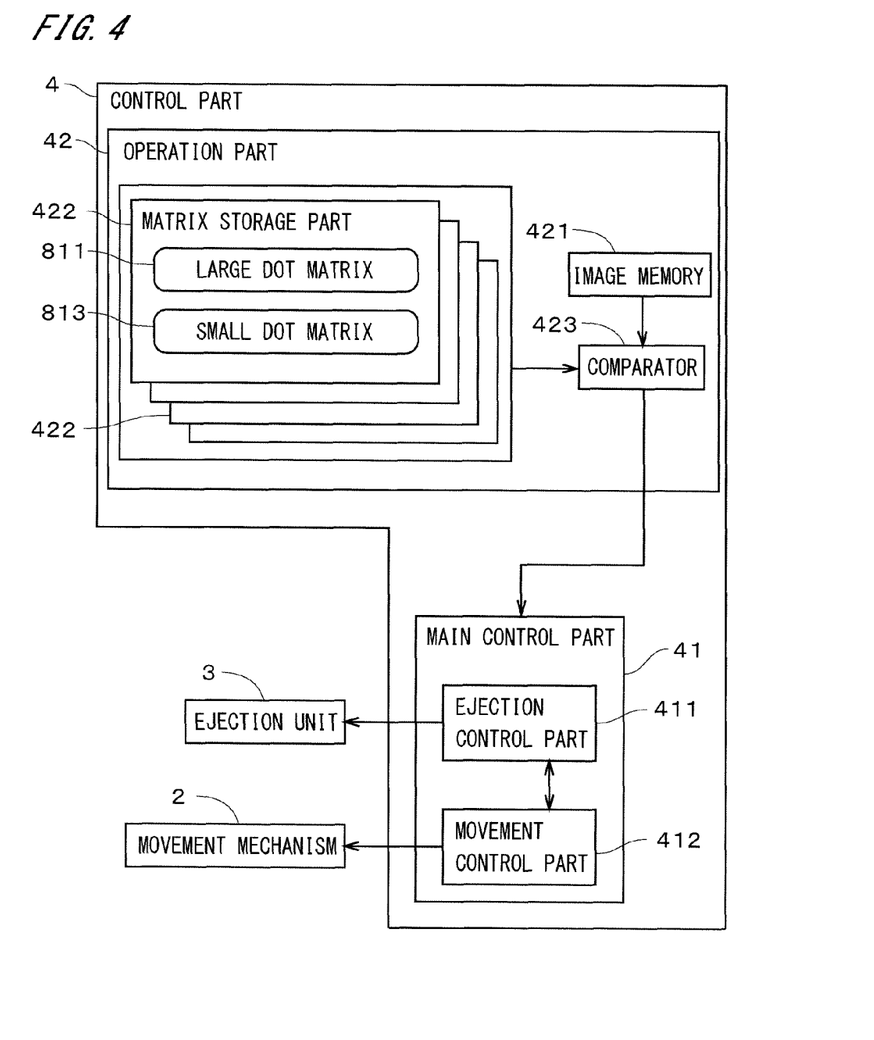
FIG. 4 is a block diagram showing functions of a control part.

The control part 4 is configured as a general computer system in which a CPU that performs various types of computational processing, a ROM that stores a basic program, and a RAM that stores various types of information are connected to a bus line. FIG. 4 is a block diagram showing functions of the control part 4. In FIG. 4, part of the configuration of the image recording apparatus 1 that is connected to the control part 4 is illustrated together. The control part 4 includes the aforementioned main control part 41 and an operation part 42 that performs various types of computations The operation part 42 includes an image memory 421, a plurality of matrix storage parts 422 (also called "screen pattern memories (SPMs)"), and a comparator 423 (halftoning circuit). The image memory 421 stores data of a color original image (hereinafter, referred to as "original image data") that is input from outside. The matrix storage parts 422 are memories that respectively store threshold matrices corresponding to a plurality of color components. The comparator 423 serves as a comparison part that compares the original image data with the threshold matrix for each color component. Note that the comparison part may be implemented by software.

Each of the matrix storage parts 422 stores a large dot matrix 811 that is a threshold matrix for large dots, and a small dot matrix 813 that is a threshold matrix for small dots. The large dot matrix 811 and the small dot matrix 813 are each a threshold matrix used in frequency modulated (FM) screening in which tones are expressed by changing the number of randomly arranged dots. While in FIG. 4, the large dot matrix 811 and the small dot matrix 813 stored in a single matrix storage part 422 are illustrated, the matrix storage parts 422 for the other color components each also store a large dot matrix 811 and a small dot matrix 813. In the following description, the large dot matrix 811 and the small dot matrix 813 are also collectively referred to as a "matrix set".

The main control part 41 includes an ejection control part 411 and a movement control part 412. The movement control part 412 controls the movement of the recording media 9 relative to the ejection unit 3 by the movement mechanism 2 based on an output from the operation part 42. The ejection control part 411 controls ink ejection from the outlets of the ejection unit 3 in synchronization with the movement of the recording media 9 relative to the ejection unit 3 based on the output from the operation part 42.

Figure 5:
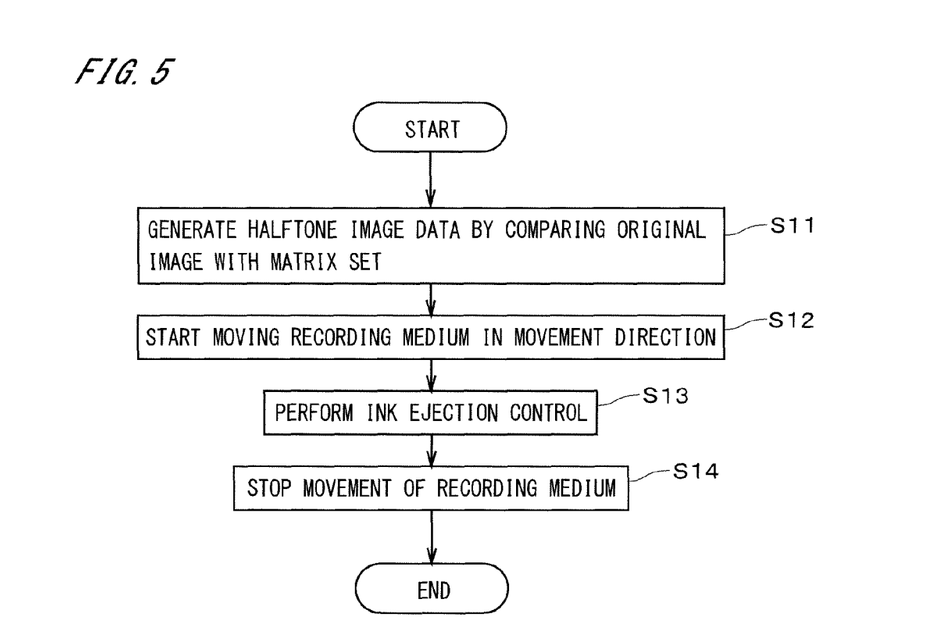
FIG. 5 is a flowchart of an image recording operation performed by the image recording apparatus.

Next, the recording of an image performed by the image recording apparatus 1 will be described with reference to FIG. 5. FIG. 5 is a flowchart of an image recording operation, focusing on a single recording medium 9. Although in the following description, a focus is given on only a matrix set for one color component among the matrix sets prepared for four color components of black, cyan, magenta, and yellow, the same processing will also be performed on the matrix sets for the other color components.

When the image recording apparatus 1 performs the image recording operation, first, an original image is halftoned (i.e., screening processing is performed) by the comparator 423 comparing the pixel value of each pixel indicated by the original image data with a corresponding threshold value in the large dot matrix 811 and a corresponding threshold value in the small dot matrix 813 in the matrix set, whereby halftone image data used in the image recording operation is generated (step S11).

Figure 6:
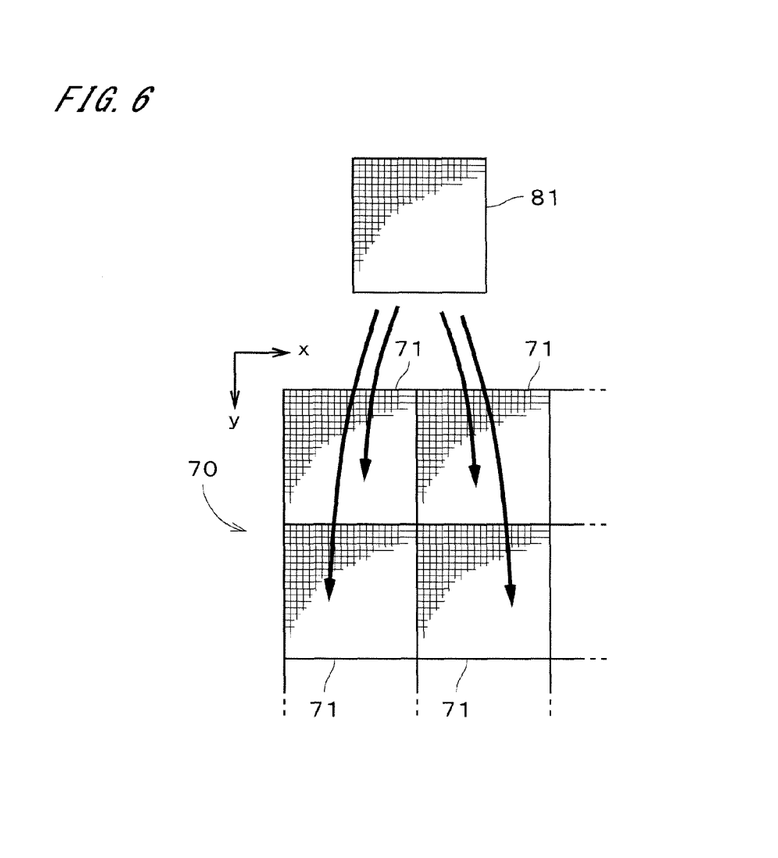
FIG. 6 illustrates an original image and a threshold matrix.

Here, the halftoning (screening) of the original image will be described. FIG. 6 is an abstract view of an original image and a threshold matrix. In FIG. 6, one of the threshold matrices in the matrix set is indicated by 81. In the threshold matrix 81, a plurality of elements are arranged in both a row direction and a column direction, the row direction corresponding to the width direction of the recording media 9 (indicated as the x direction in FIG. 6) and the column direction corresponding to the movement direction (indicated as the y direction in FIG. 6). In the original image 70 as well, a plurality of pixels are arranged in both the row and column directions. In the following description, it is assumed that the original image 70 is expressed by tone values (i.e., pixel values respective pixels can take) that range from 0 to 255.

When halftoning the original image 70, the original image 70 is divided into a large number of areas of the same size so as to set repetitive areas 71 that are the units of halftoning as shown in FIG. 6. The matrix storage parts 422 each have a storage area that corresponds to a single repetitive area 71 and store a threshold matrix 81 obtained by setting a threshold value at each address (coordinates) in the storage area. Conceptually, each of the repetitive areas 71 of the original image 70 and the threshold matrix 81 for each color component are superimposed on each other, and the pixel value of each pixel in the repetitive area 71 is compared with the corresponding threshold value in the threshold matrix 81. The comparison between the pixel values and the threshold values is performed using the two threshold matrices corresponding to the two types of dot sizes (i.e., the large dot matrix 811 and the small dot matrix 813), whereby whether or not to perform rendering at that pixel position on the recording medium 9, and the size of a dot to be rendered are determined.

In the actual operation, the pixel value of one pixel in the original image 70 is read from the image memory 421 based on an address signal given from an address generator of the comparator 423 in FIG. 4. The address generator also generates an address signal that indicates the position of that pixel in the repetitive area 71, and two threshold values in the large dot matrix 811 and the small dot matrix 813 are specified and read from the matrix storage part 422. Between the two threshold values, the threshold value in the large dot matrix 811 is greater than that in the small dot matrix 813. Then, the above pixel value and the two threshold values are compared by the comparator 423, so that the dot size at the position of each pixel (i.e., each rendering position) in the halftone image, which is an output image, is determined in sequence.

Specifically, each pixel value in the original image 70 (hereinafter, referred to as an "input pixel value") and the corresponding threshold value in the large dot matrix 811 are compared, and if the input pixel value is greater than the threshold value, a value of "2" is assigned to a corresponding pixel in the halftone image. Hereinafter, the pixel value in the halftone image is referred to as a "halftone pixel value". If the input pixel value is less than or equal to the threshold value in the large dot matrix 811, the input pixel value is compared with the corresponding threshold value in the small dot matrix 813. If the input pixel value is greater than the threshold value in the small dot matrix 813, a halftone pixel value of "1" is assigned to the corresponding position in the halftone image, and if the input pixel value is less than or equal to the threshold value, a halftone pixel value of "0" is assigned to that position.

When halftone image data that is a group of halftone pixel values for each color component in a portion to be first printed has been generated in the image recording apparatus 1, the movement control part 412 drives the movement mechanism 2 to start moving the recording medium 9 in the movement direction (step S12). Then, in parallel with the generation of the halftone image data, the ejection control part 411 controls the heads 31 of the ejection unit 3 in synchronization with the movement of the recording medium 9, whereby ink is ejected from the outlets (step S13).

The position of each pixel in the halftone image with respect to the X direction is associated with one of the outlets. If the halftone pixel value corresponding to an ejection position (i.e., pixel position) on a recording medium 9 that has reached below an outlet is "2", a large dot is formed at that ejection position, and if the halftone pixel value is "1", a small dot is formed. If the halftone pixel value is "0", a dot is not formed at that ejection position.

By performing the above-described printing operation for each of black, cyan, magenta, and yellow, a color halftone image that represents the color original image is recorded on the recording medium 9. As described previously, the recording media 9 are supplied one by one from the supply part 51 and collected by the discharge part 52 after the image recording operation. When the entire halftone image has been recorded on a predetermined number of recording media 9, the supply of the recording media 9 is stopped and the image recording operation ends (step S14).

Figure 7:
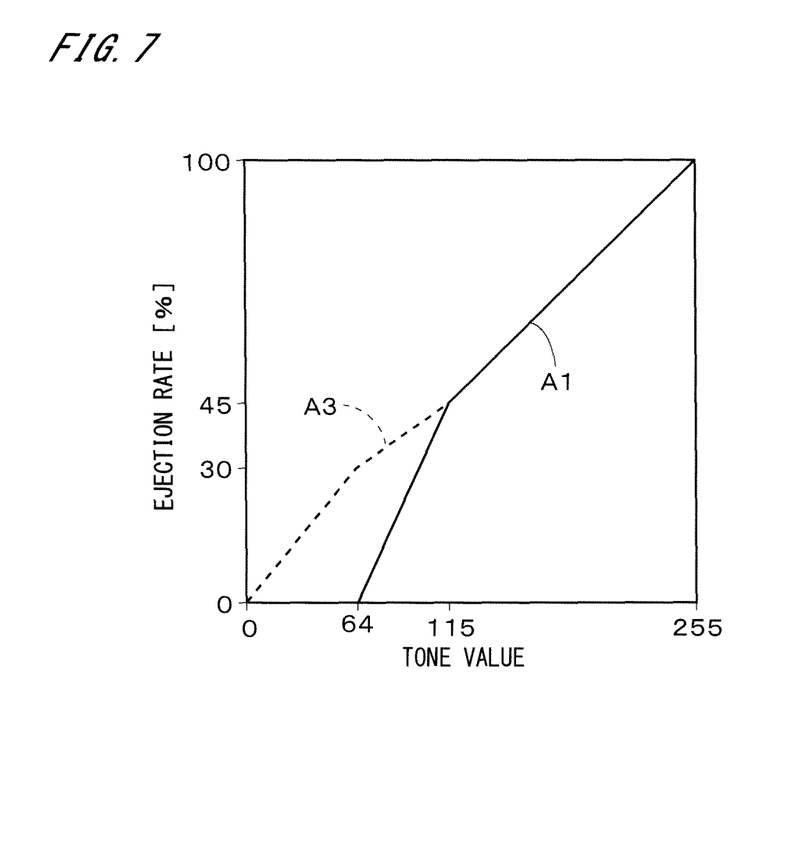
FIG. 7 illustrates the characteristics of a matrix set.

Next, the characteristics of the matrix set will be described. In FIG. 7, the vertical axis indicates an ejection rate when the image recording apparatus 1 records an original image with a uniform tone value, and the horizontal axis indicates the tone value in the original image. Assuming that a reference number is the number of positions defined as positions to which ink dots can be applied in a unit area on the recording medium 9, the aforementioned ejection rate is a value that indicates the proportion of the number of dots that are actually ejected from one of the heads 31 to the unit area to the reference number. If the tone value is 255 (i.e., a maximum tone value that can be expressed on the recording media 9), the ejection rate is usually 100%, and if the tone value is 0 (i.e., a minimum tone value that can be expressed on the recording media 9), the ejection rate is 0%.

In FIG. 7, the ejection rate for fine droplets of ink of the large size is shown by the solid line indicated by A1. In the following description, the ejection rate for fine droplets of ink of the large size and the ejection rate for fine droplets of ink of the small size are respectively referred to as a "large-dot ejection rate" and a "small-dot ejection rate". In FIG. 7, a total ejection rate that is an ejection rate for fine droplets of ink of all sizes, i.e., a sum of the large- and small-dot ejection rates is also shown by the broken line indicated by A3. The vertical axes, horizontal axes, solid lines, and broken lines in FIGS. 10 and 11, which will be described later, indicate the same as those in FIG. 7.

The threshold values in the large dot matrix 811 range from 64 to 254, and the threshold values in the small dot matrix 813 range from 0 to 115. As described previously, at corresponding positions in the two threshold matrices of a matrix set, the threshold value in the large dot matrix 811 is greater than that in the small dot matrix 813. If a large dot has been formed at one position, a small dot will not be rendered at that position even if the input pixel value exceeds the threshold value.

As shown in FIG. 7, as the tone value in the original image increases from 0 to 64, the ejection rate for only small dots increases linearly from 0% to 30% as indicated by the broken line A3. As the tone value increases from 64 to 115, the total ejection rate linearly increases from 30% to 45% as indicated by the broken line A3, and the large-dot ejection rate linearly increases from 0% to 45% as indicated by the solid line A1. A difference between the broken line A3 and the solid line A1 corresponds to the small-dot ejection rate, and the small-dot ejection rate decreases gradually with increasing tone value. As indicated by the broken line A3, an increasing rate of the total ejection rate in the range of tone values that are less than 64 (i.e., a rate of an increase in the total ejection rate to an increase in the tone value) is greater than that of the total ejection rate in the range of tone values that are greater than or equal to 64 and less than 115. As the tone value increases from 115 to 255, the ejection rate for only large dots linearly increases from 45% to 100% as indicated by the solid line A1. At this time, the small-dot ejection rate is 0%, and fine droplets of ink of the small size are not ejected.

In the case of generating threshold matrices that correspond to the respective dot sizes in a matrix set, a base threshold matrix is created using, for example, the method disclosed in Japanese Patent Application Laid-Open No. 2008-199154, the disclosure of which is herein incorporated by reference, and an offset value is added to each threshold value so that the minimum threshold value matches tone values that can appear for that dot size, while narrowing the range of threshold values as necessary.

If the aforementioned tone values "115" and 64" are respectively referred to as a "first tone value" and a "second tone value", in the image recording apparatus 1, the first tone value and the second tone value are substantially stored in the control part 4 as a result of the matrix set with the aforementioned characteristics being stored in each of the matrix storage parts 422. The first tone value may be appropriately changed in the range of tone values that are greater than a minimum tone value (0) that can be expressed on the recording media 9 by the image recording apparatus 1 and that are smaller than or equal to a 50% tone value (128) that is a median value between the minimum tone value (0) and the maximum tone value (255). The second tone value may be appropriately changed in the range of tone values that are greater than the minimum tone value (0) and smaller than the first tone value.

If fine droplets of ink of the large size and fine droplets of ink of the small size are respectively referred to as "first droplets" and "second droplets", in the image recording apparatus 1, as a result of the main control part 41 controlling the movement mechanism 2 and the heads 31, only the second droplets are ejected toward the recording medium 9 in the range of tone values that are greater than or equal to the minimum tone value (0) and less than the second tone value (64). In the range of tone values that are greater than or equal to the second tone value (64) and less than the first tone value (115), the first droplets and the second droplets are ejected toward the recording medium 9, and the total ejection rate (i.e., sum of the ejection rate for the first droplets and the ejection rate for the second droplets) and a first droplet proportion that is the proportion of the ejection rate for the first droplets to the total ejection rate increase gradually with increasing tone value. The total ejection rate at the first tone value (115) is less than 50%. In the range of tone values that are greater than or equal to the first tone value (115), only the first droplets are ejected toward the recording medium 9.

As a result, the graininess of the image to be recorded on the recording medium 9 can be improved in a highlight area where the tone value is close to the minimum tone value (0). Furthermore, by recording an image using only fine droplets of ink of the maximum size the heads 31 can eject at the 50% tone value (128) where the spatial frequency of dots on the recording medium 9 becomes maximum and streaking is likely to occur and in the range of tone values that are greater than the 50% tone value (128), it is possible to suppress the occurrence of streaking while reducing the degree of instability of the landing positions of the fine droplets of ink.

In the image recording apparatus 1, the increasing rate of the total ejection rate in the range of tone values that are less than the second tone value (64) is greater than that in the range of tone values that are greater than or equal to the second tone value (64) and less than the first tone value (115). Thus, it is possible to suppress the occurrence of a tone jump in the range of tone values at or near the second tone value (64) at which the ejection of the first droplets starts.

In the image recording apparatus 1, the ejection rates of fine droplets of ink of all the sizes ejected from the heads 31 of the ejection unit 3 are controlled by the control part 4 comparing each pixel value in the original image with corresponding threshold values in threshold matrices of a matrix set. Accordingly, the ejection rates of fine droplets of ink of a plurality of sizes can be readily controlled.

Figure 8:
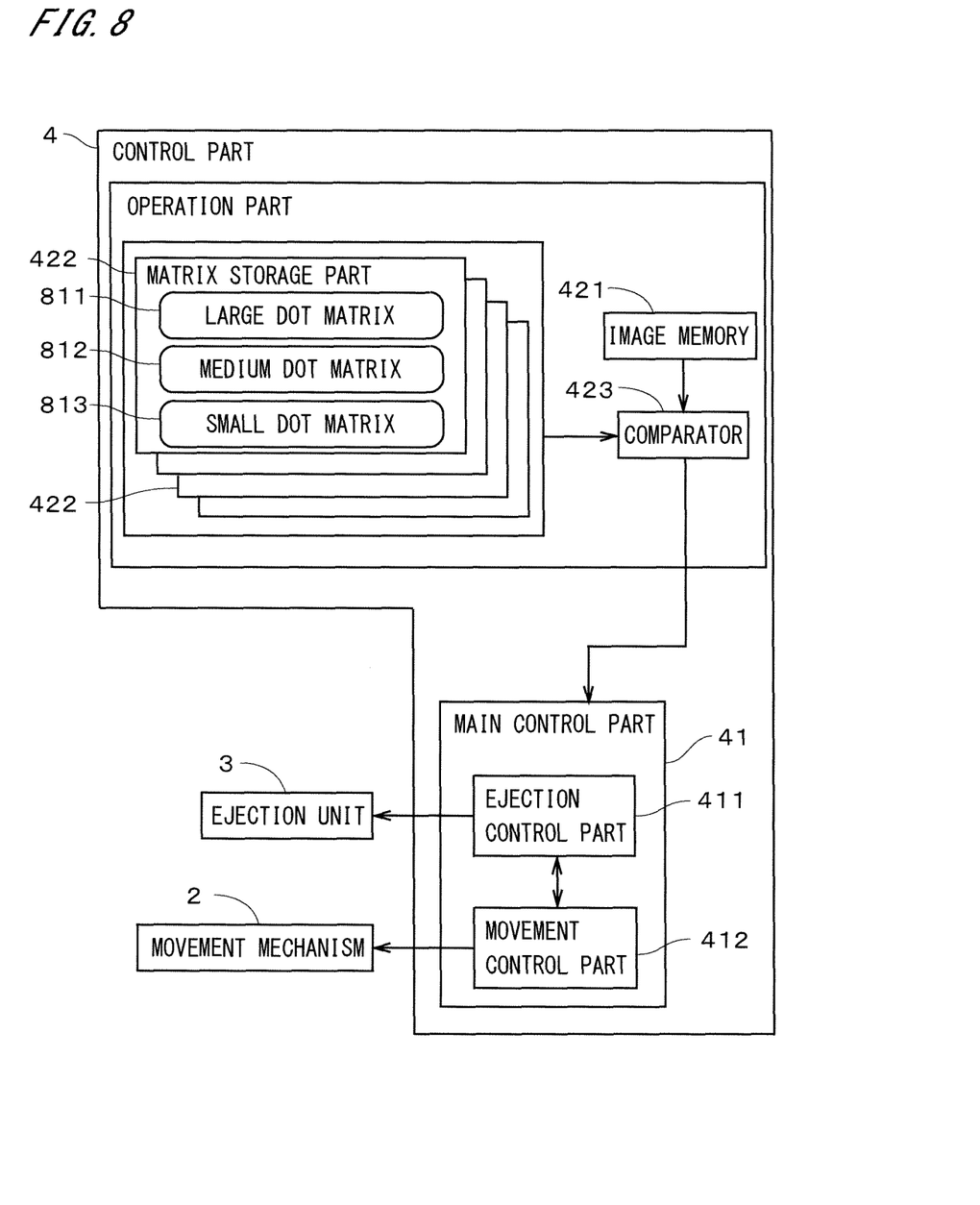
FIG. 8 is a block diagram showing functions of a control part of an image recording apparatus according to a second embodiment.

FIG. 8 is a block diagram showing functions of a control part 4 of an image recording apparatus according to a second embodiment of the present invention. As shown in FIG. 8, in the image recording apparatus according to the second embodiment, a medium dot matrix 812 is also stored in each matrix storage part 422 of the control part 4, in addition to a large dot matrix 811 and a small dot matrix 813. The other constituent elements are the same as in image recording apparatus 1 illustrated in FIGS. 1 and 2, and thus corresponding constituent elements are denoted by the same reference numerals in the following description.

In the image recording apparatus according to the second embodiment, the size of fine droplets of ink ejected from each outlet of each head 31 is switched among three types, a "large size", a "small size", and a "medium size" by the ejection control part 411 of the control part 4 controlling the ejection unit 3, the large size being a maximum size, the small size being a minimum size, and the medium size being smaller than the large size and larger than the small size. Accordingly, ink dots to be formed on the recording media 9 are also switched among "large dots", "small dots", and "medium dots".

Like the large dot matrix 811 and the small dot matrix 813, the medium dot matrix 812 is a threshold matrix that is used in FM screening in which tones are expressed by changing the number of randomly arranged dots. In the following description, the large dot matrix 811, the medium dot matrix 812, and the small dot matrix 813 are also collectively referred to as a "matrix set". At the same positions in the three threshold matrices, the threshold value in the large dot matrix 811 is the greatest, and the threshold value in the small dot matrix 813 is the smallest. The threshold value in the medium dot matrix 812 is a value between the threshold values in the large dot matrix 811 and the small dot matrix 813.

The flowchart of an image recording operation performed by the image recording apparatus according to the second embodiment is substantially the same as in the first embodiment, and thus descriptions thereof will be described with reference to FIG. 5. When the image recording operation is performed, first, an original image is halftoned into halftone image data by a comparator 423 shown in FIG. 8 comparing the pixel value of each pixel indicated by original image data 70 (see FIG. 6) stored in an image memory 421 with the corresponding threshold values in the large dot matrix 811, the medium dot matrix 812, and the small dot matrix 813 in a matrix set (step S11).

When halftoning the original image, as described above, the pixel value of each pixel in each repetitive area 71 shown in FIG. 6 is compared with the threshold values in the three threshold matrices (i.e., the large dot matrix 811, the medium dot matrix 812, and the small dot matrix 813) corresponding to the three types of dot sizes in a matrix set. Accordingly, whether or not to perform rendering on the position of that pixel on the recording medium 9, and the size of the dot to be rendered are determined.

In the actual operation, first, an input pixel value that is a pixel value in the original image is compared with a corresponding threshold value in the large dot matrix 811, and if the input pixel value is greater than the threshold value, a halftone pixel value of "3" is assigned to a corresponding pixel in a halftone image. If the input pixel value is less than or equal to the threshold value in the large dot matrix 811, the input pixel value is compared with a corresponding threshold value in the medium dot matrix 812. If the input pixel value is greater than the threshold value in the medium dot matrix 812, a halftone pixel value of "2" is assigned to the corresponding position in the halftone image. If the input pixel value is less than or equal to the threshold value in the medium dot matrix 812, the input pixel value is compared with a corresponding threshold value in the small dot matrix 813. If the input pixel value is greater than the threshold value in the small dot matrix 813, a halftone pixel value of "1" is assigned to the corresponding position in the halftone image, and if the input pixel value is less than or equal to the threshold value, a halftone pixel value of 0" is assigned to that position.

When halftone image data of a portion to be first printed has been generated in the image recording apparatus, the movement control part 412 of the main control part 41 controls the movement mechanism 2 to start moving the recording media 9 in the movement direction (step S12). Then, in parallel with the generation of the halftone image data, ink is ejected from a plurality of outlets in synchronization with the movement of the recording media 9 (step S13). At this time, if the halftone pixel value corresponding to an ejection position (i.e., pixel position) on a recording medium 9 is "3", a large dot is formed at that ejection position, if the halftone pixel value is "2", a medium dot is formed, and if the halftone pixel value is "1", a small dot is formed. If the halftone pixel value is "0", a dot is not formed at that ejection position.

By performing the above-described printing operation for each of black, cyan, magenta, and yellow, a color halftone image that represents the color original image is recorded on the recording medium 9. When the entire halftone image has been recorded on a predetermined number of recording media 9, the supply of the recording media 9 is stopped and the image recording operation ends (step S14).

Figure 9:
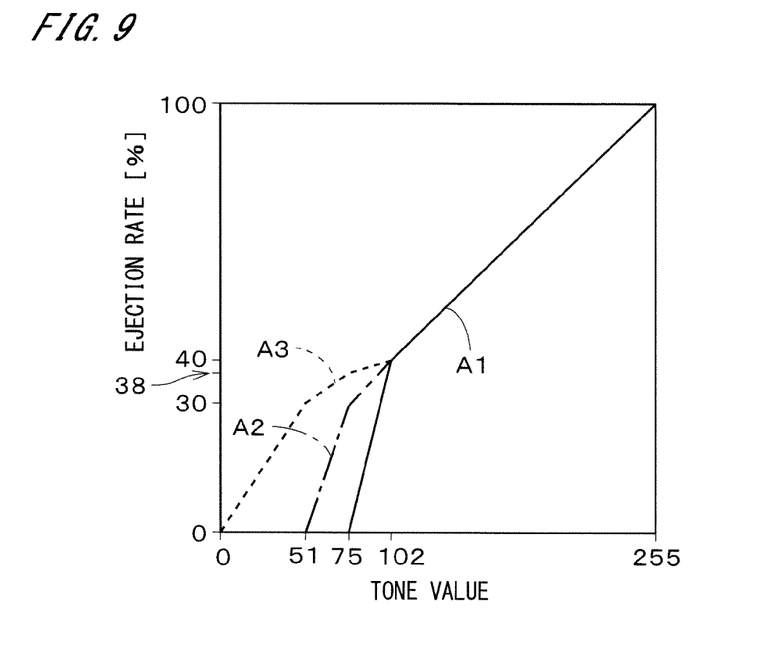
FIG. 9 illustrates the characteristics of a matrix set.

Next, the characteristics of a matrix set according to the second embodiment will be described. In FIG. 9, the vertical axis indicates an ejection rate when the image recording apparatus records an original image with a uniform tone value, and the horizontal axis indicates the tone value in the original image. In FIG. 9, a large-dot ejection rate is shown by the solid line indicated by A1, and a sum of the large-dot ejection rate and a medium-dot ejection rate (i.e., an ejection rate of fine droplets of ink of the medium size) is shown by the dashed dotted line indicated by A2. Also, a total ejection rate that is an ejection rate of fine droplets of ink of all sizes, i.e., a sum of the large-, medium-, and small-dot ejection rates is shown by the broken line indicated by A3. The vertical axes, the horizontal axes, the solid lines, the dashed dotted lines, and the broken lines in FIGS. 12 to 14, which will be described later, indicate the same as those in FIG. 9.

As shown in FIG. 9, the threshold values in the large dot matrix 811 range from 75 to 254, and the threshold values in the medium dot matrix 812 range from 51 to 102. The threshold values in the small dot matrix 813 range from 0 to 102. As described previously, at corresponding positions of the three threshold matrices in a matrix set, the threshold value in the medium dot matrix 812 is greater than that in the small dot matrix 813, and the threshold value in the large dot matrix 811 is greater than that in the medium dot matrix 812. When a large dot has been formed at one position, a small dot and a medium dot will not be formed at that position even if the input pixel value exceeds the threshold values, and if a medium dot has been formed at one position, a small dot will not be formed at that position even if the input pixel value exceeds the threshold value.

As the tone value in the original image increases from 0 to 51, the ejection rate for only small dots increases linearly from 0% to 30% as indicated by the broken line A3. As the tone value increases from 51 to 75, the total ejection rate (sum of the small- and medium-dot ejection rates) linearly increases from 30% to 38% as indicated by the broken line A3, and the medium-dot ejection rate linearly increases from 0% to 30% as indicated by the dashed dotted line A2. A difference between the broken line A3 and the dashed dotted line A2 corresponds to the small-dot ejection rate, and the small-dot ejection rate decreases gradually with increasing tone value. As indicated by the broken line A3, an increasing rate of the total ejection rate in the range of tone values that are less than 51 is greater than that in the range of tone values that are greater than or equal to 51 and less than 75.

As the tone value increases from 75 to 102, the total ejection rate (sum of the small-, medium-, and large-dot ejection rates) linearly increases from 38% to 40% as indicated by the broken line A3, and a sum of the medium- and large-dot ejection rates also linearly increases from 30% to 40% as indicated by the dashed dotted line A2. The large-dot ejection rate also linearly increases from 0% to 40% as indicated by the solid line A1. A difference between the broken line A3 and the dashed dotted line A2 corresponds to the small-dot ejection rate, and the small-dot ejection rate decreases gradually with increasing tone value. A difference between the dashed dotted line A2 and the solid line A1 corresponds to the medium-dot ejection rate, and the medium-dot ejection rate also decreases gradually with increasing tone value. In the range of tone values that are greater than or equal to 75 and less than 102, the medium-dot ejection rate at each tone value is greater than the small-dot ejection rate at that tone value. As indicated by the broken line A3, an increasing rate of the total ejection rate in the range of tone values that are greater than or equal to 51 and less than 75 is greater than that in the range of tone values that are greater than or equal to 75 and less than 102.

As the tone value increases from 102 to 255, the ejection rate for only large dots increases linearly from 40% to 100% as indicated by the solid line A1. The small- and medium-dot ejection rates are both 0%, and thus fine droplets of ink of the small and medium sizes are not ejected.

If the aforementioned tone values of "102", "75", and "51" are respectively referred to as a "first tone value", a "second tone value", and a "third tone value", in the image recording apparatus 1, as a result of the matrix set with the aforementioned characteristics being stored in each matrix storage part 422, the first tone value, the second tone value, and the third tone value are substantially stored in the control part 4. The first tone value may be appropriately changed in the range of tone values that are greater than a minimum tone value (0) and less than or equal to a 50% tone value (128). The second tone value may be appropriately changed in the range of tone values that are greater than the minimum tone value (0) and less than the first tone value, and the third tone value may be appropriately changed in the range of tone values that are greater than the minimum tone value (0) and less than the second tone value.

If fine droplets of ink of the large size, the medium size, and the small size are respectively referred to as "first droplets", "second droplets", and "third droplets", in the image recording apparatus 1, only the third droplets are ejected toward the recording medium 9 in the range of tone values that are greater than or equal to the minimum tone value (0) and less than the third tone value (51). In the range of tone values that are greater than or equal to the third tone value (51) and less than the second tone value (75), the second droplets and the third droplets are ejected toward the recording medium 9, and the total ejection rate (i.e., sum of the ejection rate for the second droplets and the ejection rate for the third droplets) and a second droplet proportion that is the proportion of the ejection rate for the second droplets to the total ejection rate increase gradually with increasing tone value.

In the range of tone values that are greater than or equal to the second tone value (75) and less than the first tone value (102) (i.e., part of the range of tone values that are less than the first tone value), the first droplets, the second droplets, and the third droplets are ejected toward the recording medium 9, and the total ejection rate (i.e., sum of the ejection rate for the first droplets, the ejection rate for the second droplets, and the ejection rate for the third droplets) and a first droplet proportion increase gradually with increasing tone value. The total ejection rate at the first tone value (102) is less than 50%. In the range of tone values that are greater than or equal to the first tone value (102), only the first droplets are ejected toward the recording medium 9.

Accordingly, as in the first embodiment, the graininess of the image to be recorded on the recording medium 9 can be improved in a highlight area where the tone value is close to the minimum tone value (0). By recording an image using only fine droplets of ink of the maximum size the heads 31 can eject in the range of tone values that are greater than or equal to the 50% tone value (128), it is possible to suppress the occurrence of streaking while reducing the degree of instability of the positions of landing of fine droplets of ink.

In the image recording apparatus according to the second embodiment, the second droplet proportion is greater than a third droplet proportion (i.e., the proportion of the ejection rate for the third droplets to the total ejection rate) in the range of tone values that are greater than or equal to the second tone value (75) and less than the first tone value (102). It is thus possible to further suppress the occurrence of streaking.

Because the increasing rate of the total ejection rate in the range of tone values that are greater than or equal to the third tone value (51) and less than the second tone value (75) is greater than that in the range of tone values that are greater than or equal to the second tone value (75) and less than the first tone value (102), the occurrence of a tone jump can be suppressed in the range of tone values at or near the second tone value (75) where the ejection of the first droplets starts. Furthermore, because the increasing rate of the total ejection rate in the range of tone values that are less than the third tone value (51) is greater than that in the range of tone values that are greater than or equal to the third tone value (51) and less than the second tone value (75), the occurrence of a tone jump can be suppressed in the range of tone values at or near the third tone value (51) where the ejection of the second droplets starts.

While the above has been a description of embodiments of the present invention, the above-described embodiments can be modified in various ways.

Figure 10:
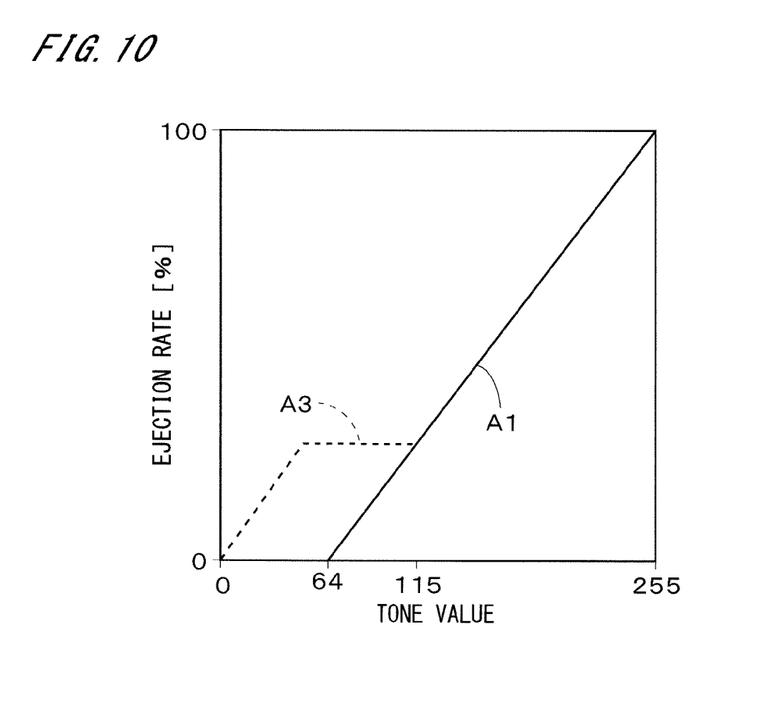
FIG. 10 illustrates the characteristics of another matrix set.
Figure 11:
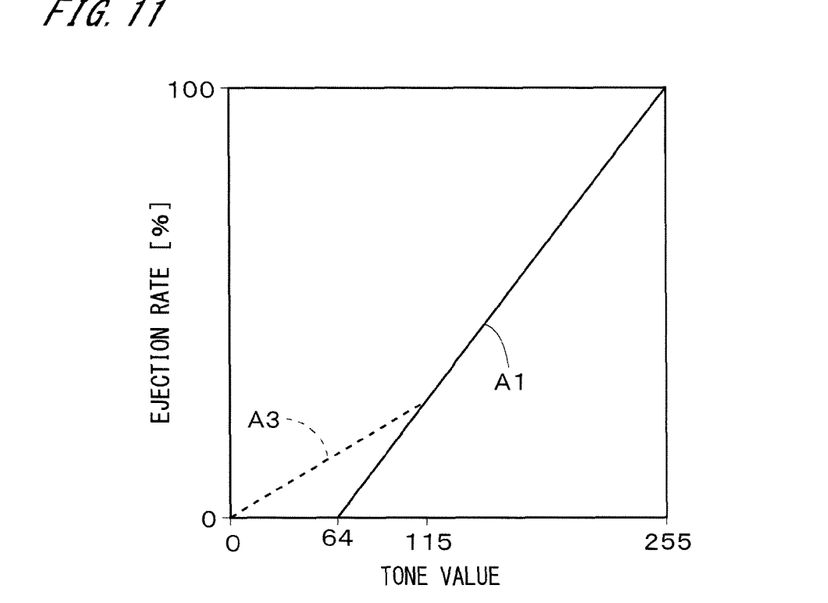
FIG. 11 illustrates the characteristics of another matrix set.

For example, in the matrix set of the image recording apparatus 1 according to the first embodiment, the total ejection rate A3 in the range of tone values that are greater than or equal to the second tone value (64) and less than the first tone value (115) may be a fixed value less than 50% as illustrated in FIG. 10. Alternatively, as illustrated in FIG. 11, the total ejection rate A3 in the range of tone values that are less than the first tone value (115) may increase linearly with increasing tone value in the original image.

Figure 12:
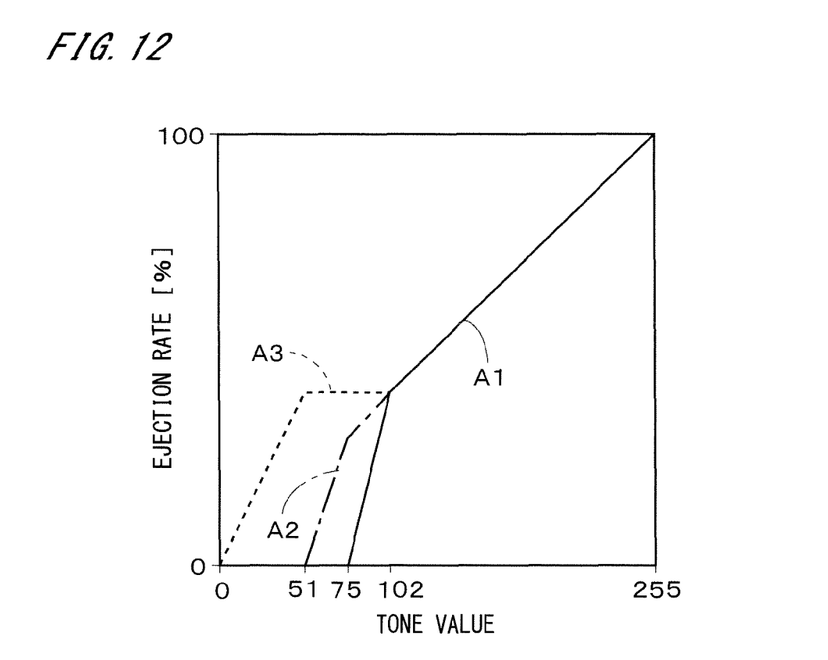
FIG. 12 illustrates the characteristics of another matrix set.
Figure 13:
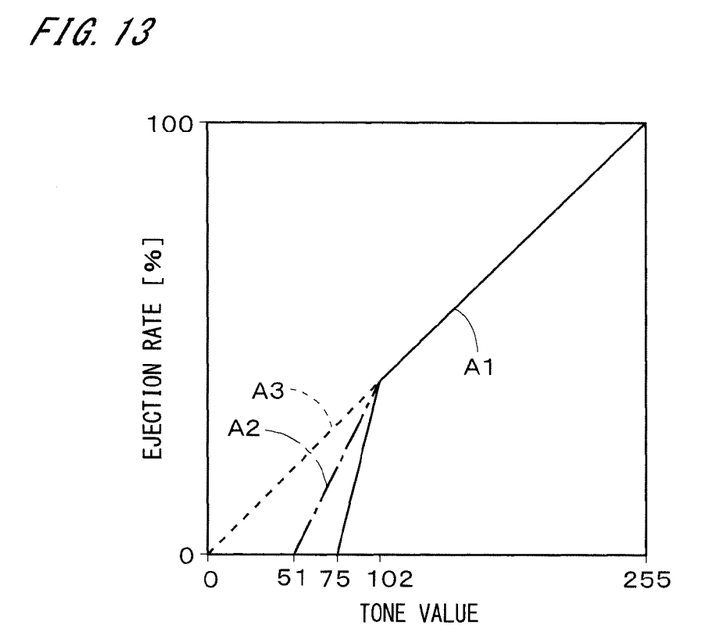
FIG. 13 illustrates the characteristics of another matrix set.

In the matrix set of the image recording apparatus according to the second embodiment, the total ejection rate A3 in the range of tone values that are greater than or equal to the third tone value (51) and less than the first tone value (102) may be a fixed value less than 50% as illustrated in FIG. 12. Alternatively, as illustrated in FIG. 13, the total ejection rate A3 in the range of tone values that are less than the first tone value (102), and the sum A2 of the large- and medium-dot ejection rates may increase linearly with increasing tone value in the original image.

Figure 14:
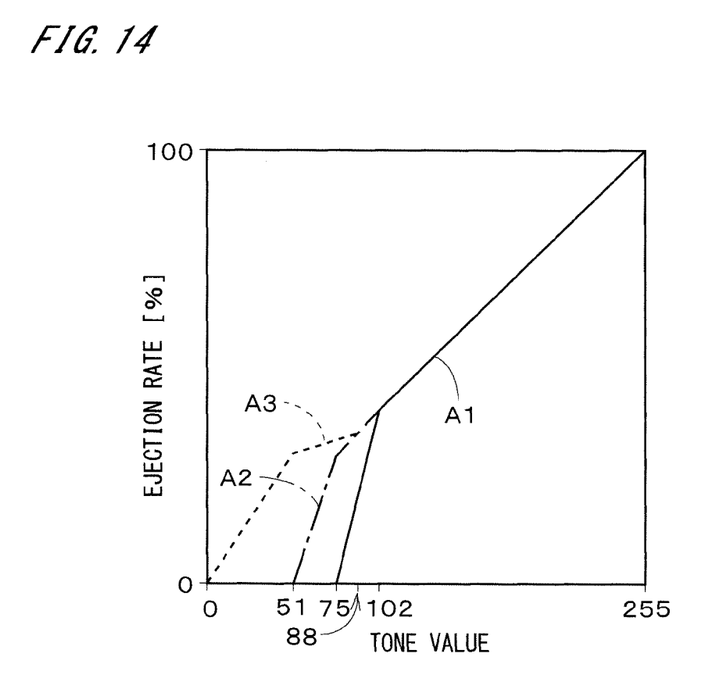
FIG. 14 illustrates the characteristics of another matrix set.

Furthermore, as illustrated in FIG. 14, the small-dot ejection rate (difference between the broken line A3 and the dashed dotted line A2) may become 0% at a tone value (88) that is smaller than the first tone value (102) where the medium-dot ejection rate (difference between the dashed dotted line A2 and the solid line A1) is 0%. In the example shown in FIG. 14, the first, second, and third droplets are ejected toward the recording medium 9 in the range of tone values that are greater than or equal to 75 and less than 88 (i.e., part of the range of tone values that are less than the first tone value), the total ejection rate and the first droplet proportion linearly increase with increasing tone value, and the second droplet proportion is greater than the third droplet proportion. Accordingly, the occurrence of streaking can be suppressed as described above.

In the matrix sets of the image recording apparatus according to the first and the second embodiments, the total ejection rate may become 100% at tone values that are less than the maximum tone value, and the total ejection rate may become less than 100% at the maximum tone value.

In the case of halftoning a threshold matrix, it is also possible to use amplitude modulated (AM) screening in which tones are expressed by changing the size of a dot cluster that is a group of regularly arranged dots. Alternatively, an original image may be halftoned using an error diffusion method.

In the image recording apparatuses, the number of sizes of fine droplets of ink each head 31 of the ejection unit 3 can eject is not limited to two or three, and it may be four or more. Also, in the image recording apparatus, the operation of generating original image data and the printing operation do not necessarily have to be performed in parallel, and if it is possible to provide a sufficiently large memory in the main control part 41, the image recording operation may be started after the generation of halftone image data of the entire original image has been completed.

In the above-described image recording apparatus, for example, the ejection unit 3 may be moved in the Y direction by the movement mechanism 2 over the recording media 9 that are not moving, as long as the recording media 9 travels in the Y direction relative to the ejection unit 3. The structure of the image recording apparatus may be applied to, for example, image recording apparatuses that perform interlace printing, and may be applied to image recording apparatuses that record images on long rolls of paper. The recording media 9 may be films, thin metal plates, or the like other than printing paper.

The configurations of the above-described embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2012-073602 filed in the Japan Patent Office on Mar. 28, 2012, the entire disclosure of which is incorporated herein by reference.

REFERENCE SIGNS LIST

1 Image recording apparatus
2 Movement mechanism
4 Control part
9 Recording medium
31 Head
70 Original image
81 Threshold matrix
95 Pixel
97 Small dot
811 Large dot matrix
812 Medium dot matrix
813 Small dot matrix
S11 to S14 Step

The invention claimed is:

1. An image recording apparatus for recording an image on a recording medium, comprising:
    an ejection part that ejects fine droplets of ink toward a recording medium;
    a movement mechanism that moves said recording medium relative to said ejection part; and
    a control part that controls said ejection part and said movement mechanism so that an image is recorded on said recording medium,
    wherein a size of fine droplets of ink ejected from said ejection part is switchable,
    a width of a dot that is formed on said recording medium by a fine droplet of ink having a minimum size is greater than a width of a recording pixel that is set on said recording medium,
    said control part stores a first tone value and a second tone value, said first tone value being greater than a minimum tone value that is expressible on said recording medium and being less than or equal to a 50% tone value that is a median value between said minimum tone value and a maximum tone value, and said second tone value being greater than said minimum tone value and being smaller than said first tone value, and
    as a result of said control part controlling said ejection part,
    in a range of tone values that are greater than or equal to said first tone value, only a first droplet that is a fine droplet of ink having a maximum size is ejected toward said recording medium, and
    in a range of tone values that are greater than or equal to said second tone value and less than said first tone value, said first droplet and a second droplet that is a fine droplet of a size smaller than said first droplet are ejected toward said recording medium, and a total ejection rate and a first droplet rate increase gradually with increasing tone value, said total ejection rate being a total of ejection rates of fine droplets of ink of all sizes, and said first droplet rate being a proportion of an ejection rate of said first droplet to said total ejection rate.

2. The image recording apparatus according to claim 1, wherein
    said second droplet is a fine droplet of said minimum size.

3. The image recording apparatus according to claim 2, wherein an increasing rate of said total ejection rate with increasing tone value in a range of tone values that are less than said second tone value is greater than an increasing rate of said total ejection rate with increasing tone value in the range of tone values that are greater than or equal to said second tone value and less than said first tone value.

4. The image recording apparatus according to claim 1, wherein
said second droplet is greater than a third droplet that is a fine droplet of said minimum size.

5. The image recording apparatus according to claim 4, wherein
in part of a range of tone values that are less than said first tone value, said first droplet, said second droplet, and said third droplet are ejected toward said recording medium, said total ejection rate and said first droplet rate increase gradually with increasing tone value, and in said part of the range of tone values, a second droplet rate that is a proportion of an ejection rate of said second droplet to said total ejection rate is greater than a third droplet rate that is a proportion of an ejection rate of said third droplet to said total ejection rate.

6. The image recording apparatus according to claim 5, wherein
an increasing rate of said total ejection rate with increasing tone value in a range of tone values that are less than said second tone value is greater than an increasing rate of said total ejection rate with increasing tone value in the range of tone values that are greater than or equal to said second tone value and less than said first tone value.

7. The image recording apparatus according to claim 4, wherein
an increasing rate of said total ejection rate with increasing tone value in a range of tone values that are less than said second tone value is greater than an increasing rate of said total ejection rate with increasing tone value in the range of tone values that are greater than or equal to said second tone value and less than said first tone value.

8. The image recording apparatus according to claim 1, wherein
an increasing rate of said total ejection rate with increasing tone value in a range of tone values that are less than said second tone value is greater than an increasing rate of said total ejection rate with increasing tone value in the range of tone values that are greater than or equal to said second tone value and less than said first tone value.

9. The image recording apparatus according to claim 1, wherein
said control part controls ejection rates of fine droplets of ink of said all sizes ejected from said ejection part by comparing a pixel value in an original image of said image and a threshold value in a threshold matrix.

10. An image recording method of recording an image on a recording medium, comprising the steps of:
a) ejecting fine droplets of ink from an ejection part toward a recording medium; and
b) recording an image on said recording medium by moving said recording medium relative to said ejection part in parallel with said step a),
wherein a first tone value and a second tone value are prepared in advance, said first tone value being greater than a minimum tone value that is expressible on said recording medium and being less than or equal to a 50% tone value that is a median value between said minimum tone value and a maximum tone value, and said second tone value being greater than said minimum tone value and smaller than said first tone value,
a size of fine droplets of ink ejected from said ejection part is switchable,
a width of a dot that is formed on said recording medium by a fine droplet of ink of a minimum size is greater than a width of a recording pixel that is set on said recording medium, and
as a result of said ejection part being controlled in said step a),
in a range of tone values that are greater than or equal to said first tone value, only a first droplet that is a fine droplet of ink of a maximum size is ejected toward said recording medium, and
in a range of tone values that are greater than or equal to said second tone value and less than said first tone value, said first droplet and a second droplet that is a fine droplet of a size smaller than said first droplet are ejected toward said recording medium, and a total ejection rate and a first droplet rate increase gradually with increasing tone value, said total ejection rate being a total of ejection rates of fine droplets of ink of all sizes, and said first droplet rate being a proportion of an ejection rate of said first droplet to said total ejection rate.

11. The image recording method according to claim 10, wherein
said second droplet is a fine droplet of said minimum size.

12. The image recording method according to claim 11, wherein
an increasing rate of said total ejection rate with increasing tone value in a range of tone values that are less than said second tone value is greater than an increasing rate of said total ejection rate with increasing tone value in the range of tone values that are greater than or equal to said second tone value and less than said first tone value.

13. The image recording method according to claim 10, wherein
said second droplet is greater than a third droplet that is a fine droplet of said minimum size.

14. The image recording method according to claim 13, wherein
in part of a range of tone values that are less than said first tone value, said first droplet, said second droplet, and said third droplet are ejected toward said recording medium, said total ejection rate and said first droplet rate increase gradually with increasing tone value, and in said part of the range of tone values, a second droplet rate that is a proportion of an ejection rate of said second droplet to said total ejection rate is greater than a third droplet rate that is a proportion of an ejection rate of said third droplet to said total ejection rate.

15. The image recording method according to claim 14, wherein
an increasing rate of said total ejection rate with increasing tone value in a range of tone values that are less than said second tone value is greater than an increasing rate of said total ejection rate with increasing tone value in the range of tone values that are greater than or equal to said second tone value and less than said first tone value.

16. The image recording method according to claim 13, wherein
an increasing rate of said total ejection rate with increasing tone value in a range of tone values that are less than said second tone value is greater than an increasing rate of said total ejection rate with increasing tone value in the range of tone values that are greater than or equal to said second tone value and less than said first tone value.

17. The image recording method according to claim 10, wherein an increasing rate of said total ejection rate with increasing tone value in a range of tone values that are less than said second tone value is greater than an increasing rate of said total ejection rate with increasing tone value in the range of tone values that are greater than or equal to said second tone value and less than said first tone value.

18. The image recording method according to claim 10, wherein
said control part controls ejection rates of fine droplets of ink of said all sizes ejected from said ejection part by comparing a pixel value in an original image of said image and a threshold value in a threshold matrix.

* * * * *